United States Patent
Abramov et al.

(10) Patent No.: US 6,327,676 B1
(45) Date of Patent: Dec. 4, 2001

(54) TEST EQUIPMENT

(75) Inventors: Ron Abramov, Brookline; Mary T. Donnellan, Milford, both of MA (US)

(73) Assignee: EMC Corporation, Hopkinton, MA (US)

(*) Notice: Subject to any disclaimer, the term of this patent is extended or adjusted under 35 U.S.C. 154(b) by 0 days.

(21) Appl. No.: 09/052,267

(22) Filed: Mar. 31, 1998

(51) Int. Cl.$^7$ ..................................................... H02H 3/05
(52) U.S. Cl. ........................... 714/37; 714/38; 714/41; 710/260; 710/261; 703/23; 703/26
(58) Field of Search ..................... 714/37, 38, 48, 714/49, 50, 41, 741, 703; 710/260, 261; 703/23, 26

(56) References Cited

U.S. PATENT DOCUMENTS

| | | | |
|---|---|---|---|
| 4,710,932 | * 12/1987 | Hiroshi | 371/25 |
| 4,945,302 | * 7/1990 | Janum | 324/73.1 |
| 4,947,349 | * 8/1990 | Munenaga et al. | 702/185 |
| 5,001,713 | * 3/1991 | Whetsel | 714/727 |
| 5,103,450 | * 4/1992 | Whetsel | 714/724 |
| 5,130,988 | * 7/1992 | Wilcox et al. | 714/727 |
| 5,377,197 | * 12/1994 | Patel et al. | 371/23 |
| 5,377,201 | * 12/1994 | Chakradhar et al. | 371/23 |
| 5,400,270 | * 3/1995 | Fukui et al. | 364/578 |
| 5,408,645 | * 4/1995 | Ikeda et al. | 395/575 |
| 5,757,811 | * 5/1998 | Kemmoku et al. | 371/3 |
| 6,194,909 | * 2/2001 | Belforte et al. | |

* cited by examiner

Primary Examiner—David Wiley
Assistant Examiner—Firmin Backer
(74) Attorney, Agent, or Firm—Daly, Crowley & Mofford, LLP

(57) ABSTRACT

Apparatus for testing a data storage system. The system includes an interface adapted for disposition between a host computer and a disk drives. The interface has a controller and an addressable memory interconnected through a bus. The system operates asynchronously in transferring data between the controller and the memory. The testing apparatus includes a generator for injecting an electrical disturbance into a predetermined point in the interface during a selected state when data is transferred between the memory and the controller. The disturbance is initiated in response to an actuation signal. A storage medium is provided for storing the state. A comparator is provided for monitoring current operating state of the interface and the selected state stored in the storage medium and for producing the activation signal when the current operating state of the system and the selected operating state have a predetermined relationship. The generator produces the disturbance from a source having an predetermined output impedance and the testing apparatus includes a buffer disposed between the generator and the interface for transforming the predetermined output impedance to a higher output impedance until the disturbance is injected into the system. The higher output impedance is selected to prevent current flow between the source and the point of the interface. The disturbance has a time duration less that the time duration of the transfer of the data between the memory and the controller.

15 Claims, 8 Drawing Sheets

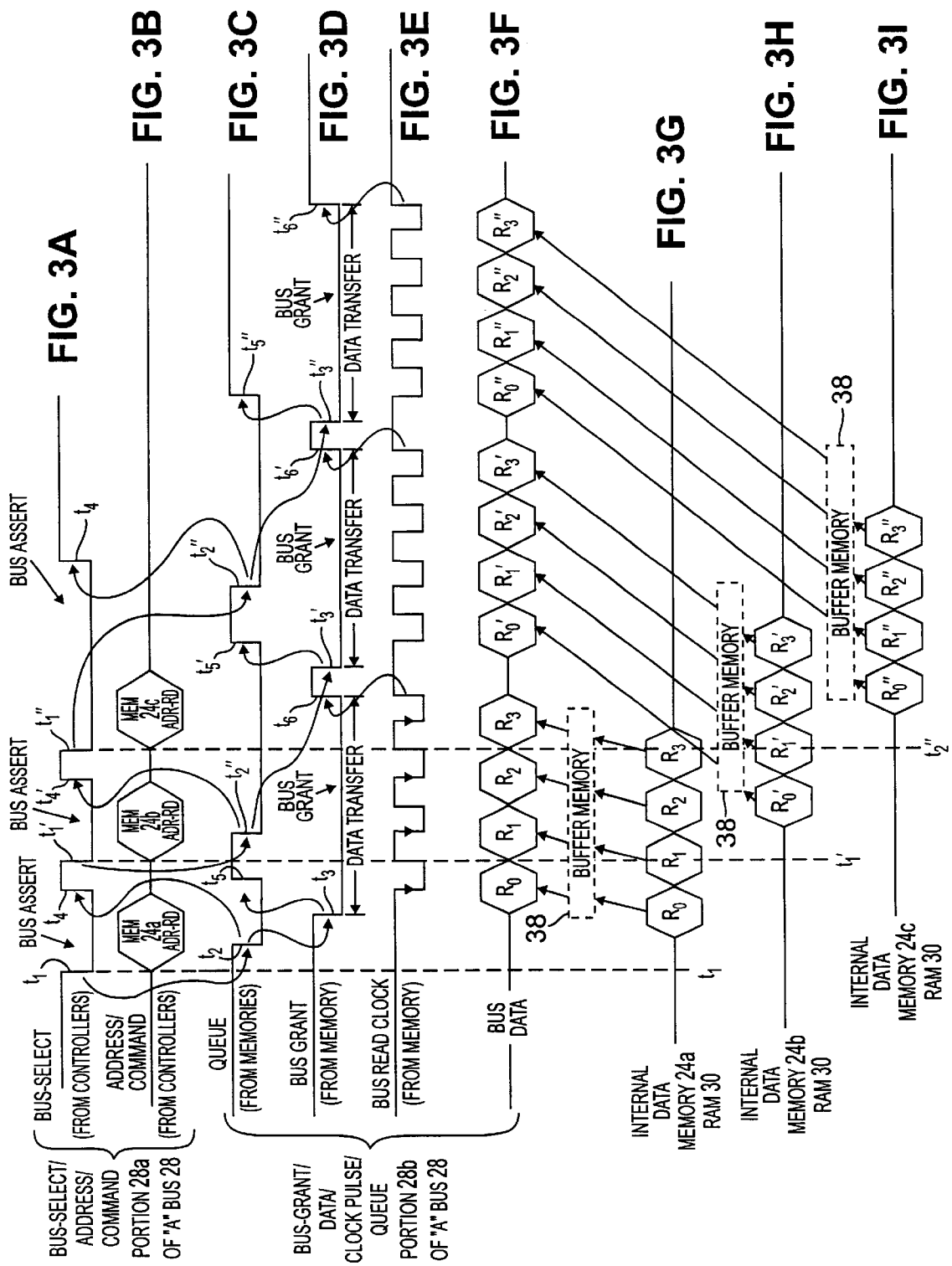

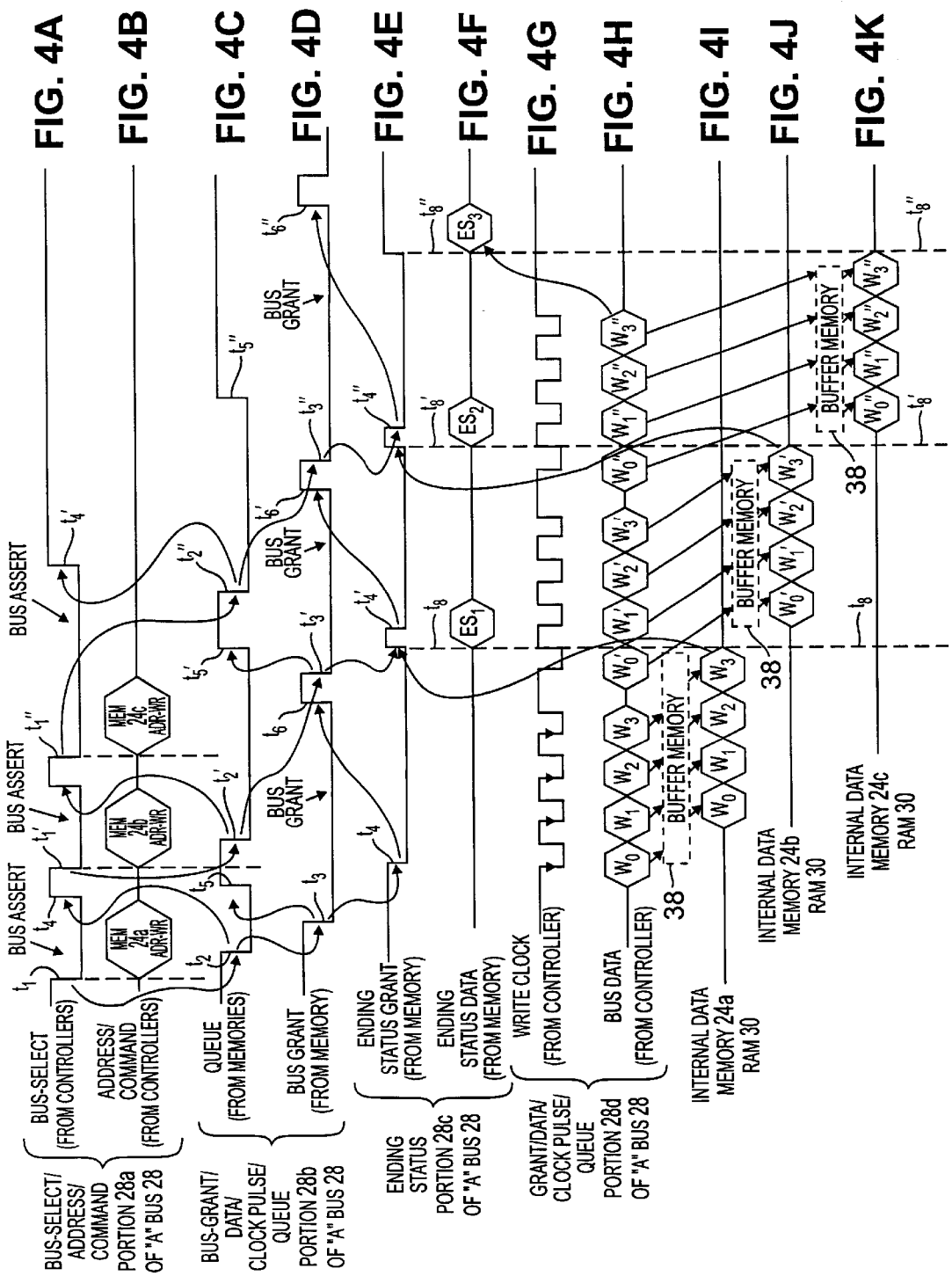

TEST EQUIPMENT

BACKGROUND OF THE INVENTION

This invention relates generally to test equipment, and more particularly to test equipment adapted to inject an electronic disturbance into an electronic system while such system is in operation.

As is known in the art, test equipment have been used in a wide variety of applications. One application is to test integrated circuits. For example, in such application, test equipment is used to introduce a logic level, i.e., a relatively static input voltage into the integrated circuit to test whether the integrated circuit produces a proper output.

The need also exists to test higher level systems, such as, for example, large capacity data storage systems. These large capacity storage systems are used with large host(e.g., main frame or open system) computer systems. The computer system generally includes data processors which perform many operations on data introduced to the computer system through peripherals included in the data storage system. The results of these operations are output to peripherals, included in the storage system.

One type of data storage system is a magnetic disk storage system. Here a bank of disk drives and the host computer system are coupled together through an interface. The interface includes CPU, or "front end", controllers and "back end" disk controllers. The interface operates the controllers in such a way that they are transparent to the computer. That is, data is stored in, and retrieved from, the bank of disk drives in such a way that the host computer system merely thinks it is operating with one host computer system memory. One such system is described in U.S. Pat. No. 5,206,939, entitled "System and Method for Disk Mapping and Data Retrieval", inventors Moshe Yanai, Natan Vishlitzky, Bruno Alterescu and Daniel Castel, issued Apr. 27, 1993, and assigned to the same assignee as the present invention.

As described in such U.S. Patent, the interface may also include, in addition to the CPU controllers and disk controllers, addressable cache memories. The cache memory is a semiconductor memory and is provided to rapidly store data from the host computer system before storage in the disk drives, and, on the other hand, store data from the disk drives prior to being sent to the host computer. The cache memory being a semiconductor memory, as distinguished from a magnetic memory as in the case of the disk drives, is much faster than the disk drives in reading and writing data.

The CPU controllers, disk controllers and cache memory are interconnected through a backplane printed circuit board. More particularly, disk controllers are mounted on disk controller printed circuit boards. CPU controllers are mounted on CPU controller printed circuit boards. And, cache memories are mounted on cache memory printed circuit boards. The disk controller, CPU controller and cache memory printed circuit boards plug into the backplane printed circuit board. In order to provide data integrity in case of a failure in a controller, the backplane printed circuit board has a pair of buses. One set the disk controllers is connected to one bus and another set of the disk controllers is connected to the other bus. Likewise, one set the CPU controllers is connected to one bus and another set of the CPU controllers is connected to the other bus. The cache memories are connected to both buses. Thus, the use of two buses provides a degree of redundancy to protect against a total system failure in the event that the controllers, or disk drives connected to one bus fail.

In one system, the communication to the controllers and the cache memories is through a pair of bi-directional lines. Typically one bi-directional line is for data and the other bi-directional line is for control signals. As noted above, each controllers is connected to only one of the buses and, therefore, only one pair of bi-directional lines are electrically connected to the controllers; however, because each one of the cache memories is connected to both buses, each cache memory has two pairs of bi-directional lines.

One such data storage system is an asynchronous system. In such asynchronous system, when a controller wishes to read data from an addressed memory, the addressed memory places the data and a clock pulse on the bus. The data and the clock travel along the bus to the controller, the controller receives the data and clocks the data into the controller using the clock placed on the bus by the addressed memory. When the controller wishes to have data written into an addressed memory, the controller places the data on the bus and the addressed memory must strobe the data on the bus into itself. However, because the system is asynchronous, the addressed memory may not be ready to accept the data on the bus. Therefore, when addressed by the controller, the memory places a clock on the bus, the clock runs to the controller, the controller detects the clock sent by the addressed memory and places the data on the bus. The data runs back to the addressed memory, and then, after a predetermined round-trip time, the addressed memory clocks in the data. A typical round-trip time may be in the order of about 100 nanosecond. During this microsecond there may be as may as 72 data transfers.

SUMMARY OF THE INVENTION

In accordance with one feature of the invention, apparatus is provided for testing a system during operation of such system. The apparatus includes a generator for injecting an electrical disturbance into the system during operation of such system. The generator injects the electrical disturbance into the system in response to an actuation signal. A storage medium is provided for storing a state representative of a selected one of a plurality of operating states of the system. A comparator is provided for monitoring current operating state of the system. The comparator produces the activation signal when the current operating state of the system and the selected stored one of the plurality of operating states have a predetermined relationship.

In accordance with another feature of the invention, apparatus is provided for testing a system during operation of such system. The apparatus produces the disturbance from a source having an predetermined output impedance. The testing apparatus includes a buffer having drivers for transforming the output impedance of the source to a relatively low output impedance during injection of the disturbance while such drivers have a relatively high output impedance in the absence of the injection of the disturbance into the system to prevent current flow between the source and the system.

In one embodiment of the invention, the apparatus is adapted to inject the disturbances randomly in time into the system.

In accordance with still another feature of the invention, apparatus is provided for testing a system operating asynchronously. The testing apparatus includes a generator for injecting an electrical disturbance into the system during the asynchronous operation of such system. The generator injects the disturbance into the system in response to an actuation signal. A storage medium is provided for storing a determined state representative of a selected one of a plurality of operating states of the system. A comparator is provided for monitoring current operating state of the system. The comparator produces the activation signal when the current operating state of the system and the selected stored one of the plurality of operating states have a predetermined relationship to thereby synchronize the disturbance to the asynchronously operating system.

In accordance with still another feature of the invention, apparatus is provided for testing an interface used in a data storage system during operation of the interface. The interface is adapted for disposition between a host computer section having host computer system processors for processing data and a bank of disk drives. The interface has a controller and an addressable memory interconnected through a bus. The interface operates asynchronously in transferring data between the controller and the memory system, such that: (A) when a controller wishes to read data from the memory, the memory places the data and a clock pulse on the bus, the data and the clock travel along the bus to the controller, the controller receives the data and clocks the data into the controller using the clock placed on the bus by the memory; and (B) when the controller wishes to have data written into the memory, the controller places the data on the bus and the memory strobes the data on the bus into itself, the memory then placing a clock on the bus, the clock running on the bus to the controller, the controller detecting the clock sent by the memory, the data running on the bus to the memory, and then, after a predetermined round-trip time, the addressed memory clocking the data on the bus into such memory. The testing apparatus includes a generator for injecting an electrical disturbance into a predetermined point in the interface during a selected state when data is transferred between the memory and the controller. The disturbance is initiated in response to an actuation signal. A storage medium is provided for the storing selected state. A comparator is provided for monitoring current operating states of the system. The comparator produces the activation signal when the current operating state of the system and the selected operating state have a predetermined relationship.

BRIEF DESCRIPTION OF THE DRAWINGS

Other features of the invention, as well as the invention itself, will become more readily apparent when read together with the accompanying drawings, in which:

FIGS. 3A through 3I are timing diagrams useful in understanding the operation of the read operation of the data storage system of FIG. 2;

FIGS. 4A through 4K are timing diagrams useful in understanding the write operation of the data storage system interface of FIG. 2.

DESCRIPTION OF THE PREFERRED EMBODIMENTS

Figure 1:
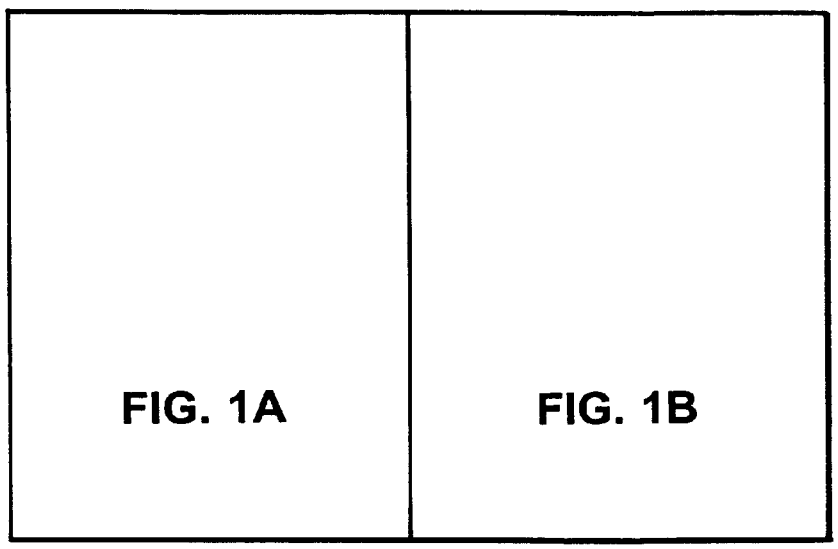
FIG. 1 is a block diagram of a computer system using a data storage system connected to test apparatus in accordance with the invention.

Referring now to FIG. 1, a computer system 10 is shown coupled to test apparatus 30, to be described in more detail in connection with FIG. 5. Suffice it to say here, however, that the computer system 10 includes a host computer section 12 having host computer processors 14 for processing data. Portions of the processed data are stored in, and retrieved data from, a bank 16 of disk drives 17 through an interface 18. Further, as will be described below, the interface 18 has a controller and an addressable memory interconnected through a bus. Data is transferred between the controller and the memory asynchronously. The test apparatus 30 is adapted to testing the interface during an interval of data transfer.

More particularly, the interface 18 includes disk controllers 20, central processor unit (CPU) controllers 22 and addressable cache memories 24a, 24b, 24c and 24d electrically interconnected through a bus 25, here a pair buses; i.e., an A bus 28 and a B bus 26. The cache memories 24a, 24b, 24c and 24d are hereinafter sometimes referred to only as addressable memories.

In order to provide data integrity in case of a failure in a disk controller 20 or CPU controller 22, the pair of buses 26, 28 is provided. One portion of the disk controllers 20 is connected to one of the buses 26, 28 and the other portion of the disk controllers 20 is connected to the other one of the buses 26, 28. Likewise, one portion of the CPU controllers 22 is connected to one of the buses 26, 28 and the other portion of the CPU controllers 22 is connected to the other one of the buses 26, 28. The cache memories 24a, 24b are connected to both buses 26, 28, as shown. In FIG. 1, the test apparatus 30 is shown positioned to inject an electrical disturbance (e.g., a pulse having a time duration as short as, in the range of about 20 nanoseconds) into a selected point of the interface, here, for example, into addressable memory 24c. The effect to the system 10 is detected by controllers 20, 25 which report a fault (i.e., an adverse effect of the disturbance) to a service processor 31.

Figure 2:
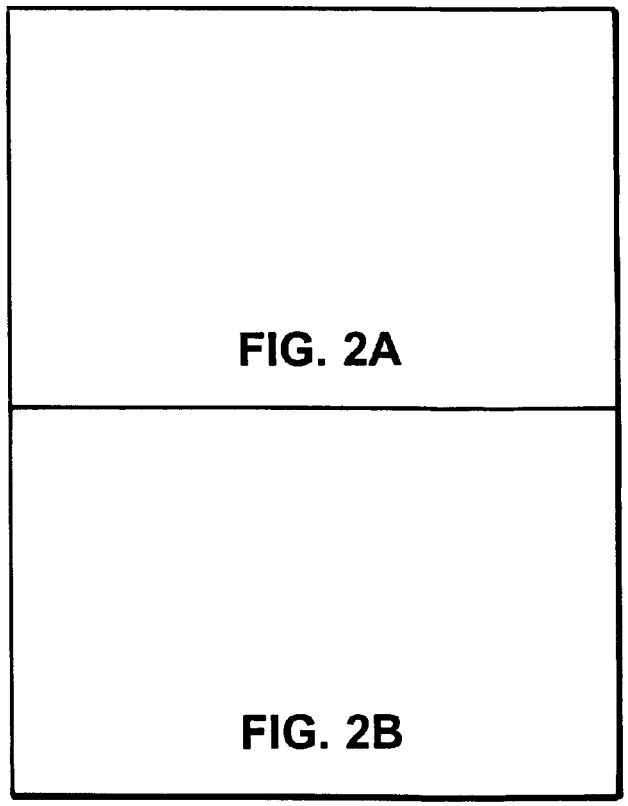
FIG. 2 is a block diagram of an interface used in the data storage system of FIG. 1, such interface providing coupling between host computer processors and a bank of disk storage devices.
Figure 1A:
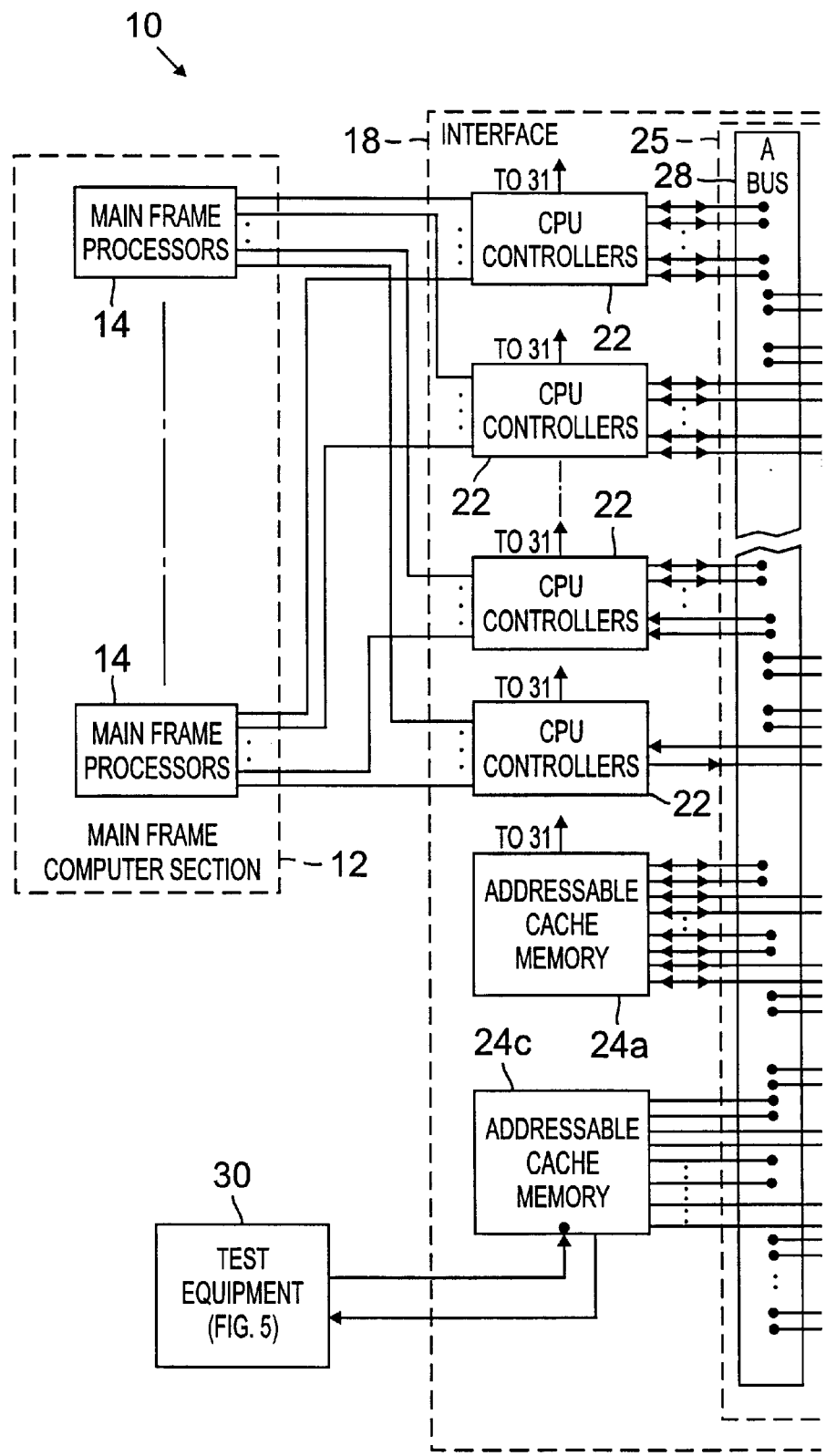
Figure 1B:
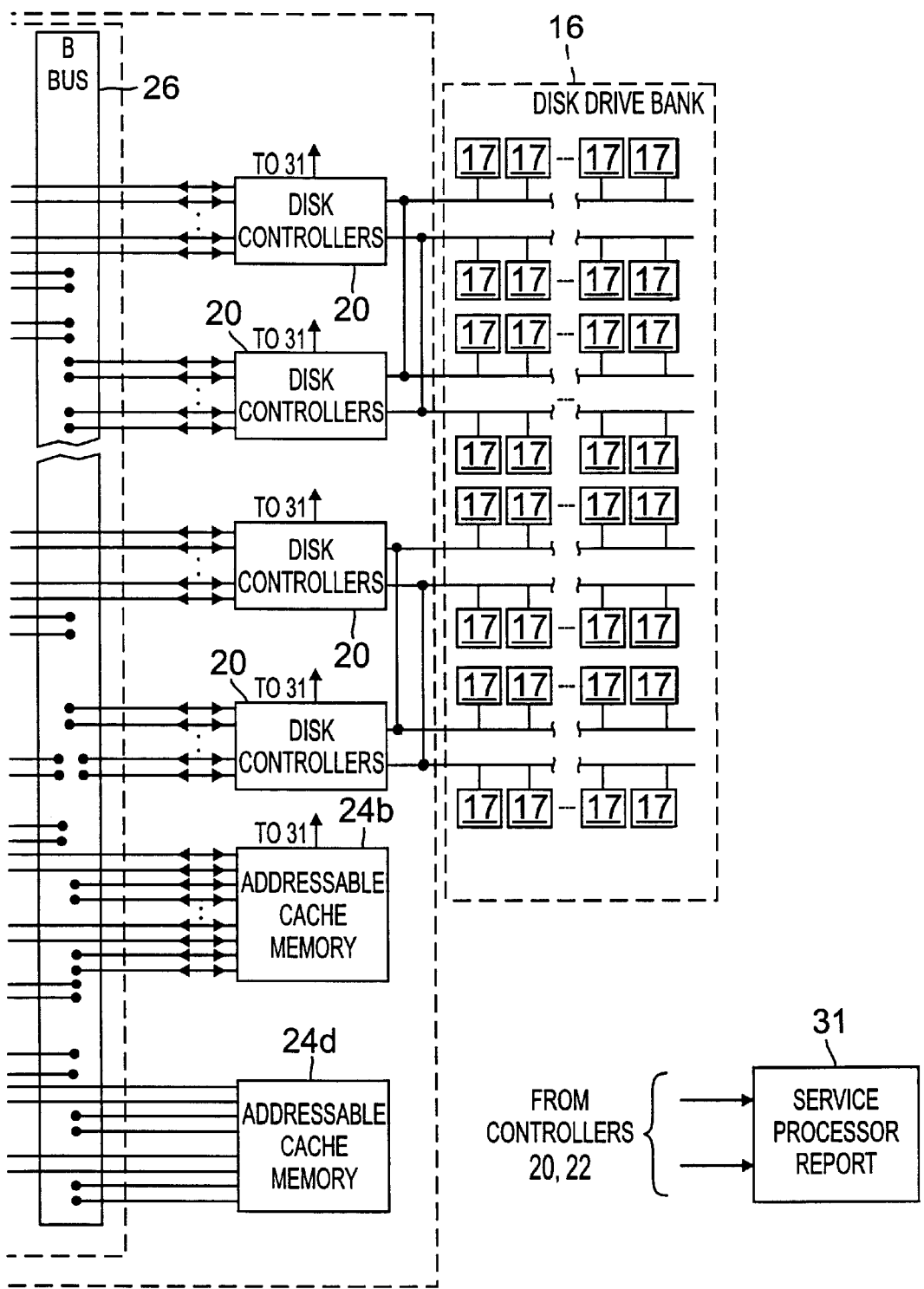
Figure 2A:
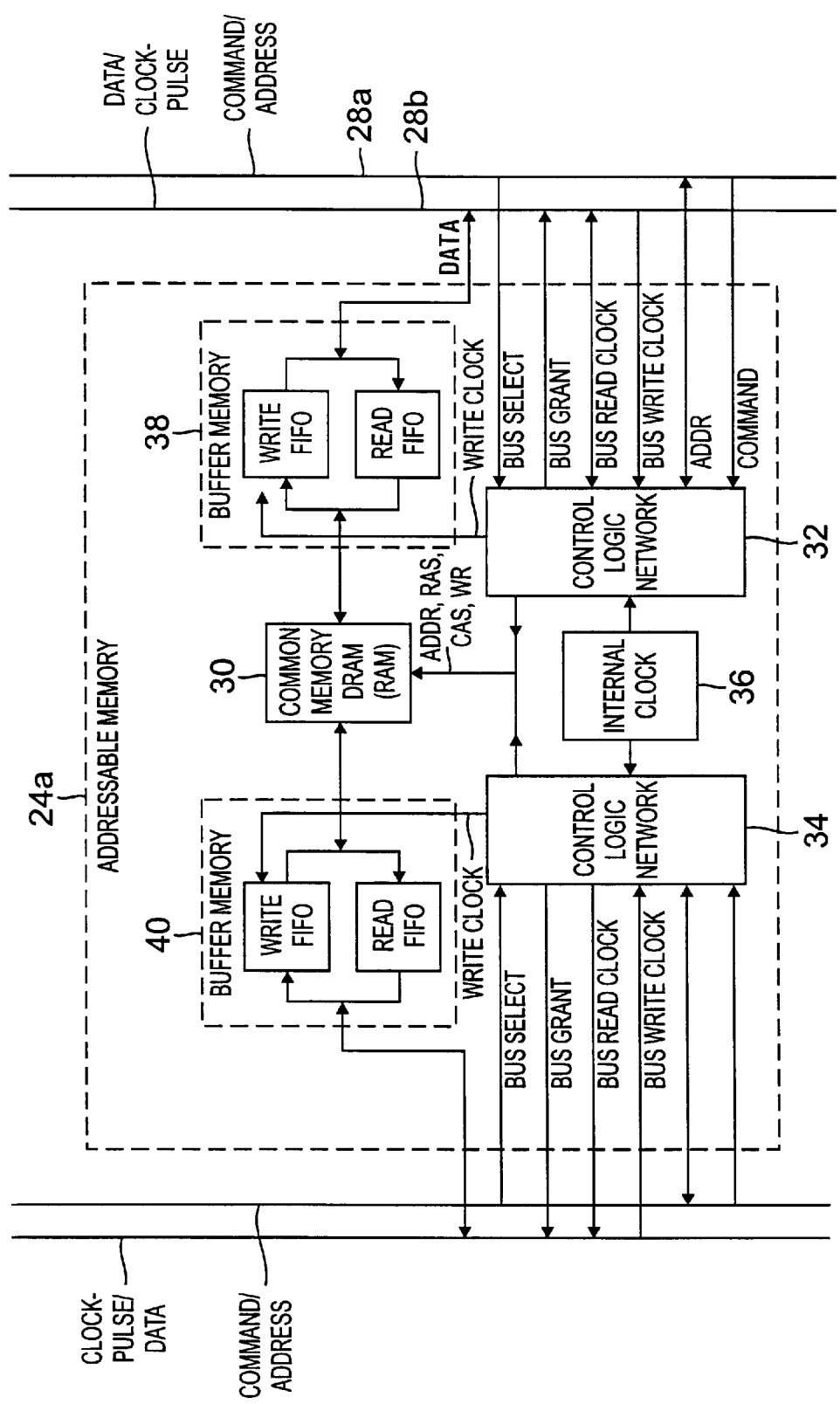
Figure 2B:
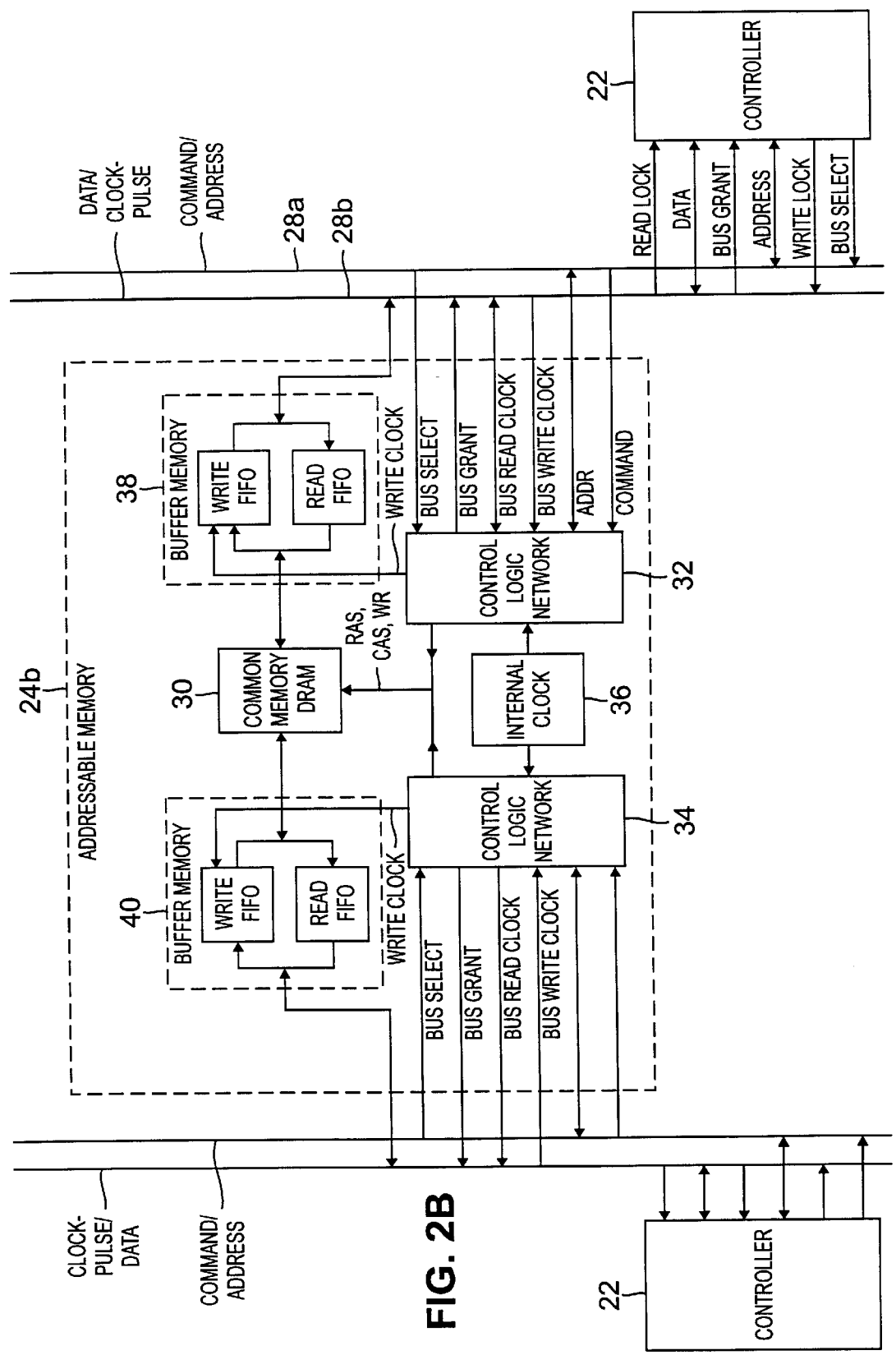

Referring now to FIG. 2, the interface 18, and more particularly, a pair of the addressable cache memories 24a, 24b, 24c and 24d, here addressable cache memories 24a, 24b, and a pair of controller 20, 22 are shown. Each one of the addressable cache memories 24a, 24b, 24c and 24d is identical in construction, but have different addresses, an exemplary one thereof, here memories 24a and 24b being shown in detail. Thus, each one of the addressable memories 24a, 24b, 24c and 24d includes: a random access memory (RAM) 30, here a dynamic random access memory (DRAM) adapted for coupling to bus 26 or bus 28 in response to row address select (RAS), column address select (CAS) write enable (W) and read enable (R) signals fed thereto; a pair of control logic networks 32, 34; internal clock 36; and a pair of buffer memories 38, 40, all arranged as shown. It is first noted that while the DRAM 30 is common to both buses 26, 28, control logic network 32 and buffer memory 38 are associated with bus 28 and control logic network 34 and buffer memory 40 are associated with bus 26. A token arbitration system, not shown, is provided for controlling sharing of the pair of buses 26, 28 by the common DRAM 30. One such bus arbitration system is described in co-pending patent application Ser. No. 08/534, 376, "Bus Arbitration System, inventor Eli Leshem, filed Sep. 28, 1995, assigned to the same assignee as the present invention, the contents thereof being incorporated herein by reference.

As described in more detail in a co-pending patent application entitled "Timing Protocol for a Data Storage System", filed Dec. 23, 1997, inventor John K. Walton, assigned to the same assignee as the present invention, the entire subject matter thereof being incorporated herein by reference, the interface 18 operates asynchronously in transferring data between a controller 22 and one of the addressable memories 24a–24c, such that: (A) when a controller wishes to read data from the memory, the memory places the data and a clock pulse on the bus, the data and the clock travel along the bus to the controller, the controller receives the data and clocks the data into the controller using the clock placed on the bus by the memory; and (B) when the controller wishes to have data written into the memory, the controller places the data on the bus and the memory strobes the data on the bus into itself, the memory then placing a clock on the bus, the clock running on the bus to the controller, the controller detecting the clock sent by the memory, the data running on the bus to the memory, and then, after a predetermined round-trip time, the addressed memory clocking the data on the bus into such memory. A detailed description of the protocol is described in the above-reference co-pending patent application filed Dec. 23, 1997. Suffice it to say here, however, that the basic read/write bus protocol for a read operation is shown in FIGS. 3A–3I and FIGS. 4A–4K, respectively, it being understood the read/write protocol for A Bus 28 is the same as the bus protocol for B bus 26. Thus, considering A bus 28, and recognizing that B bus 26 operates in the equivalent manner, it is first noted that bus 28, like bus 26, has an bus-select/address/command portion 28a, a bus-grant/data/clock-pulse/queue portion 28b, and an ending-status portion 28c, as shown in FIG. 2. Each one of the controllers 20, 22 is adapted: (a) to assert on the bus-select/command/address portion 28a of the bus 28 during a controller initiated bus assert interval ("BUS ASSERT", FIG. 3A), a command on bus portion 28a (FIGS. 3B and 4B), such command including: (i) either a write operation request (FIG. 4B,) or a read operation request (FIG. 3B); and (ii) an address for the one of the addressable memories 24a, 24b, 24c and 24d selected by the controller 20, 22 to respond to the read operation (FIG. 3B) or write operation command (FIG. 4B); and (b) to produce data (FIG. 4H) and bus write clock pulses (FIG. 4G) on the bus-grant/data/clock-pulse portion 28b of the bus 28 when a write operation is requested during a bus grant ("BUS GRANT") interval (FIG. 4D) produced by the addressed one of the memories 24a, 24b.

Each addressed one of the addressable cache memories 24a, 24b, 24c and 24d is adapted: (a) to produce on the bus-grant/data/clock-pulse portion 28b of the bus 28, a bus grant ("BUS GRANT") signal (FIGS. 3D and 4D) to initiate the bus grant interval when the addressed one of the memories 24a, 24b is available to respond to the read (FIG. 3D) or write (FIG. 4D) operation request by the controller 20, 22; (b) to provide on the bus-grant/data/clock-pulse portion 28b of the bus 28 during the bus grant interval in response to the read operation request by the controller 20, 22: (i) data at the address provided by the controller 20, 22 during the bus assert interval (FIGS. 3A and 4A); and (ii) bus read clock pulses (FIG. 3E); (c) to write, in response to the write operation request by the controller 20, 22 during the bus grant interval, the data on the bus-grant/data/clock-pulse portion 28b of the bus 28 (FIG. 4H) into the addressed one of the memories 24a, 24b in response the bus write clock pulses (FIG. 4G) produced by the controller 20, 22 on the bus-grant/data/clock-pulse portion 28b of the bus 28; (d) to produce a queue signal on the bus-grant/data/clock pulse/queue portion 28b of the bus 28 (FIGS. 3C and 4C) and to remove the bus grant signal (FIG. 3D) from the bus-grant/data/clock-pulse/queue portion 28b of the bus 28 upon completion of the read or write operation requested by the controller 20, 22 terminating the bus grant interval (FIG. 3D); and to produce an ending-status signal and data on the ending-status portion 28c of the bus 28 upon completion of the write operation requested by the controller 20, 22 (FIGS. 4E and 4F). Each one of the controllers 20, 22 is adapted to provide on the bus-select/address/command portion 28a of the bus 28 another address and command after termination of a queue signal. Thus, it is noted that the while a BUS GRANT assertion by a memory initiates a data transfer interval (during which data and clock pulses are placed on the bus 28 by an addressed memory after a read operation request by a controller 20, 22 or during which data and clock pulses placed on the bus 28 by the controller 20, 22 after a write operation request by the controller 20, 22 and are written into the addressed memory), it is the controller's detection of the queue assert signal that de-asserts the BUS ASSERT independent of whether the BUS GRANT, data transfer interval has been initiated.

The control logic networks 32, 34 are configured to enable data on the bus 28, 26, respectively, to be written into the random access memory (RAM) 30 of one of the addressed one of the memories 24a, 24b, 24c and 24d in response to clock pulses produced on the bus 28, 26, respectively during a period of time when data stored in the random access memory (RAM) 30 of another one of the addressable memories 24a, 24b, 24c and 24d is transferred to the buffer memory 38, 40, respectively, thereof in response to clock signals produced by the internal clock 36 thereof as described in co-pending patent application Ser. No. 08/701,362 filed Aug. 23, 1996, inventors John K. Walton, et al. entitled TIMING PROTOCOL FOR A DATA STORAGE SYSTEM, assigned to the same assignee as the present invention, the entire subject matter thereof being incorporated herein by reference. With this arrangement, data to be read from the other one of the addressable memories (here, in this example, memory 24b) can be pre-fetched from the random access memory (RAM) 30 thereof while data is written into the first-mentioned addressable memory (here, memory 24a).

Referring now to FIGS. 3A through 3I, and considering bus 28, at time $t_1$ a first one of the controllers 20, 22 asserts the bus 28 by changing the level of the signal on the bus-select/address/command portion 28a of the bus 28 from a "high" to a "low", FIG. 3A. (It should be noted that here, to assert a bus 26, 28, a signal goes from a "high" level to a "low" level and to de-assert a bus a level goes from a "low" level to a "high" level). Next, one of the addressable memories 24a, 24b, here memory 24a is addressed, and, here, a read command is requested by the first one of the controllers 20, 22 on the bus-select/address/command portion 28a of the bus 28, as indicated in FIG. 3B. At time $t_1$, the memory 24a begins to decode its address and begins to resolve any internal bus arbitration. Once the internal bus arbitration is resolved, a RAS/CAS phase can begin. A queue assert signal is produced on the bus-grant/data/clock pulse/queue portion 28a of bus 23 (FIG. 3D) at time $t_2$ indicating that to the controller 20, 22 the memory 24a has properly responded to the address and is preparing to have data in the RAM 30 thereof read therefrom and written into the buffer memory 30 in response to clock pulses produced by the internal clock 36 (FIGS. 3G and 3F). Once the internal bus arbitration is completed, the data in the RAM 30 of addressed memory 24a is read therefrom and written into the buffer memory 30 in response to clock pulses produced by the internal clock 36 (FIGS. 3G and 3F). Once the memory 24a is ready to transfer the data in the buffer memory 38 to the bus 28 and the memory 24a produces a bus grant (i.e., bus assert) signal on the bus-grant/data/clock pulse/queue portion 28b of bus 28 (FIG. 3D) along with clock pulses (FIG. 3E) at time $t_3$. In response to the bus grant signal at time $t_3$, the queue signal is de-asserted by the controller 20, 22 which produced the BUS ASSERT at time $t_1$ and also a BUS GRANT, data transfer phase begins. In response to this queue assert signal at time $t_2$, the controller 20, 22 de-assets the bus select at time $t_4$ (FIG. 3A). Thus, a second controller 20, 22 is now allowed to assert the bus select, as shown at time $t'_1$ in FIG. 3A. As noted above, once the memory 28a has asserted the queue signal at time $t_2$, the memory 28a is able to assert a bus grant signal at time $t_3$ initiating a BUS GRANT interval during which data ($R_0$–$R_3$) may be read from the addressed memory 24a (i.e., more particularly read from buffer memory 38) and placed on the bus-grant/data/clock pulse/queue portion 28a of bus 28, as shown in FIG. 3F. along with clock pulses (FIG. 3F). After asserting BUS GRANT at time $t_3$, the queue signal is de-asserted by the controller 20, 22 at time $t_5$ (FIG. 3C). Further, as noted above, during the BUS GRANT, i.e., beginning at time $t_3$ (FIG. 3D), the data in buffer memory 38 is read therefrom and transferred to the bus portion 28b along with clock pulses (FIGS. 3F and 3E, respectively. After the last clock pulse is transmitted at time $t'_3$, the addressed memory de-asserts BUS GRANT and the data transfer interval is terminated at time $t'_3$, FIGS. 3E and 3D.

It is noted that during this first BUS GRANT interval (i.e, during the time interval between time $t_3$ and $t'_3$), a second controller 20, 22 has asserted the bus at time $t'_1$, addressed a second one of the memories, here memory 24b, and provided commands, as indicated in FIGS. 3A and 3B. The process repeats at times $t'_2$–$t'_5$, in like manner to that at times $t_2$–$t_5$. It is noted that an internal data transfer occurs in memory 24b for read data $R'_0$–$R'_3$ concurrently with the internal transfer occurring in memory 24a. It is also noted that the queue signal at time $t'_2$ de-asserted the bus select (FIG. 3A) to enable a third one of the controllers 20, 22 to address a third one of the memories, here memory 24c at time $t''_1$. The process repeats at times $t''_2$–$t''_5$ as indicted for read data $R''_0$–$R''_3$. Thus, as indicated, internal data transfer occurs in memory 24c concurrently with the internal transfers occurring in memories 24a and 24b.

With such an arrangement, because each bus assert is de-asserted by the controller in response a memory generated queue assert (which is independent of a bus grant assert), a third one of the controllers may address, and provide a command to, a third one of the memories prior to completion of the bus grant interval of a first and second addressed one of the memories thereby further reducing latent system delay.

Considering now write commands, and referring to FIGS. 4A–4K, and considering bus 28, at time $t_1$ a first one of the controllers 20, 22 asserts the bus 28 by changing the level of the signal on the bus-select/address/command portion 28a of the bus 28 from a "high" to a "low", FIG. 4A. Next, one of the addressable memories 24a, 24b, here memory 24a is addressed, and, here, a write command is requested by the first one of the controllers 20, 22 on the bus-select/address/ command portion 28a of the bus 28, as indicated in FIG. 4B. At time $t_3$, the memory 24a begins to decode its address and begin to resolve any internal bus arbitration. The RAS/CAS phase can begin. A queue asserts signal is produced on the bus-grant/data/clock pulse/queue portion 28a of bus 28 (FIG. 4D) at time $t_2$ indicating that to the controller 20, 22 that the memory 24a has properly responded to the address and is preparing to have data $W_0$–$W_3$ on the bus 28 transferred, i.e., written, into it. Once the internal bus arbitration is completed, the memory 24a is ready to transfer the data on bus 28 to buffer memory 38, the memory 24a produces a bus grant (i.e., bus assert) signal on the bus-grant/data/clock pulse/queue portion 28b of bus 28 (FIG. 4D) at time $t_3$. In response to the bus grant assert signal, the queue signal is de-asserted by the controller 20, 22 at time $t_5$. In response to this queue signal assert signal, the controller 20, 22 de-assets the bus select at time $t_4$ (FIG. 4A). Thus, a second controller 20, 22 is now allowed to assert the bus select, as shown at time $t'_1$ in FIG. 4A. It is also noted that, after the memory 28a has asserted the queue signal at time $t_2$, the memory 28a asserts a bus grant signal at time $t_3$ initiating a BUS GRANT interval during which data ($W_0$–$W_3$) may be written from the bus 28 in response to clock pulses produced on bus 23 by controller 20, 22 (FIG. 4G). After asserting BUS GRANT at time $t_3$, the queue signal is de-asserted by the controller 20, 22 at time $t_5$ (FIG. 4C) . Further, after the memory has asserted a bus grant, after the data transfer between bus 28 and the addressed memory 24a has commenced at time $t_3$, the addressed memory 24a asserts ending-status signal on the ending-status portion 28c of bus 28 (FIG. 4E) at time $t_4$. During the BUS GRANT, i.e., beginning at time $t_3$ (FIG. 3D), the data in on bus 28 is written into buffer memory 38 and transferred to the RAM 30 (FIGS. 4H and 4I). After the last clock pulse is transmitted, at time $t'_3$, the BUS GRANT interval is terminated (FIGS. 3E and 3D). After the data is transferred from the buffer memory 38 to RAM 30, the ending-status bus portion 28c is de-asserted by the memory 24a at time $t_6$ and such memory 24a sends status data to the controller 20, 22 via the ending-status portion of the bus portion 28c (FIGS. 4E and 4F). This ending-status data indicates to the controller 20, 22 issuing the address and command the results of error detection and correction processing, parity checking and time-out circuitry in the addressed memory 24a, not shown, as described in the above. It should also be noted that the bus grant cannot be de-asserted by the addressed memory 24a unless the addressed memory issued a bus grant assert, and an ending-status assert and the controller produced write clock pulses have terminated.

It is noted that during this first BUS GRANT interval (i.e, during the time interval between time $t_3$ and $t'_3$), a second controller 20, 22 has asserted the bus at time $t'_1$, addressed a second one of the memories, here memory 24b, and provided commands, as indicated in FIGS. 4A and 4B. The process repeats at times $t'_2$–$t'_6$, in like manner to that at times $t_2$–$t_6$. It is noted that an internal data transfer occurs in memory 24b for write data $W'_0$–$W'_3$ concurrently with the internal transfer occurring in memory 24a (FIG. 4J). It is also noted that the queue signal at time $t'_2$ de-asserted the bus select (FIG. 4A) to enable a third one of the controllers 20, 22 to address a third one of the memories, here memory 24c at time $t''_1$. The process repeats at times $t''_2$–$t''_5$ as indicted for read data $W''_0$–$W''_3$ (FIG. 4K). Thus, as indicated, internal data transfer occurs in memory 24c concurrently with the internal transfers occurring in memories 24a and 24b.

Figure 5:
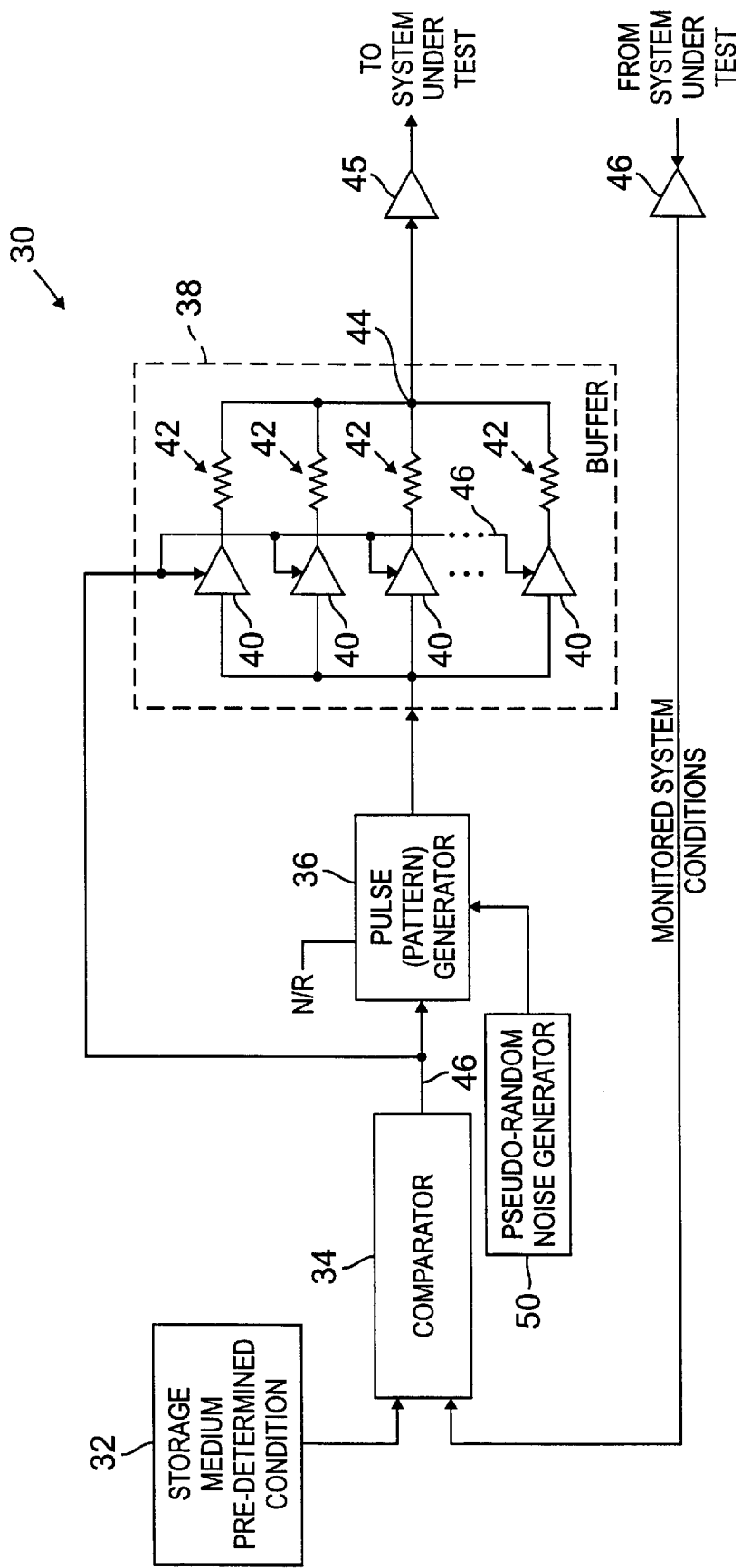
FIG. 5 is a block diagram of the test apparatus shown in FIG. 1.

Further detail is described in the above referenced co-pending patent application, suffice it to say here that test apparatus 30 shown in FIG. 5 is adapted to inject a disturbance into a selected point of the interface 18, such as at the input to one of the memories. Further, the test apparatus 30 is adapted to inject such disturbance during a transfer interval, such as, for example, the data transfer interval between time $t_3$ and $t_6$ (FIG. 3D). Further, such data transfer interval may be about 100 nanoseconds. Thus, the test apparatus 30 is adapted to inject an electrical disturbance as short as 10 nanoseconds.

Thus, referring to FIG. 5, the testing apparatus 30 includes a pulse pattern generator 36 for injecting an electrical disturbance into the interface 18 via an probe 45 during operation of such interface 18. The electrical disturbance may be a pattern of electrical pulses or an electrical pulse having a time duration of less than a data transfer interval, i.e., here less than 100 nanoseconds. Thus, the electrical disturbance may be injected for a time duration during which only one internal data transfer is taking place, such as the transfer of $R_0$ in FIG. 3G. The electrical disturbance is injected in response to an actuation signal produced by a comparator 34 on line 46.

Here, the generator 36 is included in a Hewlett-Packard Logic Analyzer Model No. 1660CP. A storage medium 32, here a RAM included in the Hewlett-Packard Logic Analyzer Model No. 1660CP, is provided for storing an operating state representative of a selected one of a plurality of operating states of the system 10. For example, the selected state may be when the signals on the A bus are as shown at time $t_2$ in FIGS. 3A–3E. In another example, the state may be a sequence of control signals on one, or more of the portions 28a, 28b of bus 28.

The comparator 32 is included in the Hewlett-Packard Logic Analyzer Model No. 1660CP and is used to monitor the current, asynchronous operating, state of the interface 18 via a probe 47 and the selected one of the plurality of operating states stored in the storage medium 32. The comparator 34 produces the activation signal on line 46 when the current operating state of the system and the selected stored one of the plurality of operating states have a predetermined relationship (e.g., when the state of the system 10 is at time $t_2$, for example) to thereby synchronize the disturbance to the asynchronously operating system 10. when the state of the system 10 is at time to synchronize the disturbance to the asynchronously operating system.

It should be noted that the output impedance of the Hewlett-Packard Logic Analyzer Model No. 1660CP is relatively low prior to the production of its pulse. Introduction of such a low output impedance to the interface will itself disturb the interface 18 circuitry,. Thus, here a buffer 38 is disposed between the generator 36 and the interface 18 for transforming the predetermined output impedance of the generator 36 to a higher output impedance prior to injection of the disturbance into the interface 18. The higher output impedance is selected to prevent current flow between the generator 36 and the interface 18 prior to injection of the disturbance. The buffer 40 provides a lower impedance during injection of the disturbance into the system 10.

Thus, here the buffer 38 includes a plurality of drivers 40 having a common input fed by the output of the generator 36. Each one of the drivers 40 has a output coupled to a relatively low impedance resistor 42. The outputs of the resistors 42 are connected together at a common node 44 which is connected to probe 45. The drivers 40 are disabled in the absence of an injection signal on line 46 thereby providing a high output impedance at node 44. In the presence of an injection signal on line 46, the drivers 40 are enabled thereby connecting the resistors 42 in parallel to provide a low output impedance at node 44 when the disturbance is injected into the interface 18. (It should be noted that the resistors 42 may be remove to, in effect, provide a short circuit (i.e., zero resistance) between the outputs of the drivers 40 and the node 44). In any event, the drivers 40 have a relatively high output impedance prior to the injection of the disturbance into the system and a relatively low output impedance during injection of the disturbance into the system. The buffer 38 is here adapted to transform the impedance of the source 36 by a factor of 100.

Other modes of operation are possible. For example, the test apparatus 30 may introduce disturbances into the system 10 randomly in time rather than only in response to the comparator 34. More particularly, the pulse generator may be driven by a pseudo-random noise generator 50 during a random mode (R) rather than from the comparator 34 during a normal mode (N). In the random disturbance introduction case, the buffer 30 provides the requisite impedance transformation to the output impedance of the pulse generator 36, as described above.

Other embodiments are with in the spirit and scope of the appended claims.

What is claimed is:

1. Apparatus for testing a system during operation of such system, such apparatus comprising:

a generator for injecting an electrical disturbance into the system during operation of such system in response to an activation signal;

a storage medium for storing a state representative of a selected one of a plurality of operating states of the system;

a comparator for monitoring current operating state of the system and the selected stored one of the plurality of operating states, for producing the activation signal when the current operating state of the system and the selected stored one of the plurality of operating states have a predetermined relationship.

2. The apparatus recited in claim 1 wherein the generator produces the disturbance from a source having an predetermined output impedance and wherein the testing apparatus includes a buffer for transforming the output impedance to a relatively low output impedance during injection of the disturbance and a relatively high output impedance in absence of such disturbance, the higher output impedance being selected to prevent current flow between the source and the system.

3. Apparatus for testing a system during asynchronous operation of such system, such apparatus comprising:

a generator for injecting an electrical disturbance into the system during operation of such system in response to an activation signal;

a storage medium for storing a state representative of a selected one of a plurality of operating states of the system;

a comparator for monitoring current operating states of the system and the selected stored one of the plurality of states, for producing the activation signal when the current operating state of the system and the selected stored one of the plurality of operating states have a predetermined relationship to synchronize the disturbance to the asynchronously operating system.

4. The apparatus recited in claim 3 wherein the generator produces the disturbance from a source having an predetermined output impedance and the testing apparatus includes a buffer for transforming the output impedance to a relatively low output impedance during injection of the disturbance and to a relatively high output impedance in absence of injection of the disturbance into the system, the higher output impedance being selected to prevent current flow between the source and the point of the system.

5. Apparatus for testing an interface having a controller and an addressable memory interconnected through a bus during asynchronous transfer of data between the controller and the memory, such testing apparatus comprising:

a generator for injecting an electrical disturbance into a predetermined point in the interface during a selected state when data is transferred between the memory arid the controller, the disturbance being is initiated in response to an activation signal;

a storage medium for storing the state;

a comparator for monitoring current operating states of the interface and the selected state stored in the storage medium and for producing the activation signal when the current operating state of the system and the selected operating state have a predetermined relationship.

6. The apparatus recited in claim 5 wherein the generator produces the disturbance from a source having an predetermined output impedance and the testing apparatus includes a buffer for transforming the output impedance to a relatively low output impedance during injection of the disturbance and to a relatively high output impedance in absence of the injection of the disturbance into the interface, the higher output impedance being selected to prevent current flow between the source and the point of the interface where the disturbance is to be introduced until the disturbance is injected into the interface.

7. The apparatus recited in claim 6 wherein the disturbance has a time duration less that the time duration of the transfer of the data between the memory and the controller.

8. Apparatus for testing a data storage system wherein a host computer section having host computer processors for processing data is coupled to a bank of disk drives through an interface, such interface having a controller and an addressable memory interconnected through a bus, such system operating asynchronously in transferring data between the controller and the memory system, such that: (A) when a controller wishes to read data from the memory, the memory places the data and a clock pulse on the bus, the data and the clock travel along the bus to the controller, the controller receives the data and clocks the data into the controller using the clock placed on the bus by the memory; and (B) when the controller wishes to have data written into the memory, the controller places the data on the bus and the memory strobes the data on the bus into itself, the memory then placing a clock on the bus, the clock running on the bus to the controller, the controller detecting the clock sent by the memory, the data running on the bus to the memory, and then, after a predetermined round-trip time, the addressed memory clocking the data on the bus into such memory, such testing apparatus comprising:

a generator for injecting an electrical disturbance into a predetermined point in the system during a selected state when data is transferred between the memory and the controller, such disturbance being initiated in response to an activation signal;

at storage medium for storing the selected state;

a comparator for monitoring current operating states of the system and the selected state stored in the storage medium, for producing the activation signal when the current operating state of the system and the selected operating state have a predetermined relationship.

9. The apparatus recited in claim 8 wherein the generator produces the disturbance from a source having an predetermined output impedance and wherein the apparatus includes a buffer disposed between the generator and the system for transforming the predetermined output impedance to a higher output impedance, such higher output impedance being selected to prevent current flow between the source and the system prior to injection of the disturbance and to transform the output impedance of the source to a lower impedance during injection of the disturbance.

10. The system recited in claim 9 wherein the disturbance has a time duration less than the time duration of the transfer of the data between the memory and the controller.

11. The system recited in claim 10 wherein the time duration is in the order of less than several hundred nanoseconds.

12. The system recited in claim 11 wherein the buffer transforms the impedance of the source by a factor of 100.

13. Apparatus for testing a system during operation of such system, such apparatus being external to the system and being adapted to inject an electrical disturbance into the system in response to a control signal produced by the apparatus, such apparatus comprising:

a generator for producing the disturbance from a source having an predetermined output impedance; and a buffer coupled between the generator and the system for switching between a high impedance and a low impedance selectively in response to the control signal and for transforming the output impedance to a relatively low output impedance during injection of the disturbance and to a relatively high output impedance in absence of injection of the disturbance into the system, the higher output impedance being selected to prevent current flow between the source and the system.

14. The system recited in claim 13 wherein the apparatus is adapted to inject a plurality of the disturbances into the system randomly in time.

15. The system recited in claim 13 wherein the buffer comprises:

a plurality of gated amplifiers, such amplifiers having inputs connected to a common terminal, such terminal being coupled to the pulse generator; and a plurality of resistors each one having one terminal; coupled to an output and a second terminal connected to a common output terminal, such common output terminal being coupled to the system;

and wherein each one of the gated amplifiers is fed by the control signal.

* * * * *